(12) United States Patent
Hillman et al.

(10) Patent No.: US 9,878,648 B2
(45) Date of Patent: Jan. 30, 2018

(54) SLIDING TABLE ASSEMBLY FOR A VEHICLE AND RELATED SYSTEMS AND METHODS

(71) Applicant: Winnebago Industies, Inc., Forest City, IA (US)

(72) Inventors: Paul Hillman, Glenville, MN (US); Steven Jergenson, Clear Lake, IA (US)

(73) Assignee: Winnebago Industries, Inc., Forest City, IA (US)

( * ) Notice: Subject to any disclaimer, the term of this patent is extended or adjusted under 35 U.S.C. 154(b) by 0 days.

(21) Appl. No.: 15/167,071

(22) Filed: May 27, 2016

(65) Prior Publication Data

US 2016/0272099 A1    Sep. 22, 2016

Related U.S. Application Data

(63) Continuation of application No. 14/210,855, filed on Mar. 14, 2014, now Pat. No. 9,371,029.

(60) Provisional application No. 61/789,416, filed on Mar. 15, 2013.

(51) Int. Cl.
| | |
|---|---|
| *A47B 23/00* | (2006.01) |
| *B60N 3/00* | (2006.01) |
| *B60P 3/36* | (2006.01) |
| *A47B 13/08* | (2006.01) |
| *A47B 1/10* | (2006.01) |
| *A47B 83/04* | (2006.01) |
| *F16C 29/04* | (2006.01) |

(52) U.S. Cl.
CPC ............... *B60N 3/001* (2013.01); *A47B 1/10* (2013.01); *A47B 13/081* (2013.01); *A47B 83/045* (2013.01); *B60P 3/36* (2013.01); *F16C 29/045* (2013.01)

(58) Field of Classification Search
CPC ........................... F25D 25/02; F25D 2325/023
USPC ......... 312/334.11, 334.12, 334.13, 408, 281; 108/137, 42, 44, 143; 292/141, 171, 271, 292/272, 277
See application file for complete search history.

(56) References Cited

U.S. PATENT DOCUMENTS

| | | | | |
|---|---|---|---|---|
| 472,088 | A | * | 4/1892 | Walker ................ E05B 65/0864 |
| | | | | 292/153 |
| 2,878,091 | A | | 3/1959 | Hammond |
| 5,197,393 | A | * | 3/1993 | Yeakle ..................... A47B 9/10 |
| | | | | 108/10 |
| 5,769,520 | A | * | 6/1998 | Jun ........................ A47B 46/00 |
| | | | | 211/88.01 |
| 6,149,120 | A | | 11/2000 | Hall |
| 6,802,264 | B2 | | 10/2004 | Kasak et al. |
| 7,677,184 | B2 | | 3/2010 | Dhanoa et al. |
| 7,845,744 | B2 | | 12/2010 | Chen et al. |
| 8,171,862 | B2 | | 5/2012 | Muirhead |
| 9,371,029 | B2 | | 6/2016 | Hillman et al. |

(Continued)

*Primary Examiner* — Matthew W Ing
(74) *Attorney, Agent, or Firm* — Faegre Baker Daniels LLP

(57) ABSTRACT

The sliding table system, apparatus and methods relate to a sliding table assembly for a recreational vehicle. In certain implementations, the table assembly has a supporting cabinet and a table frame which is capable of horizontally sliding relative to the cabinet by way of one or more slots. In certain implementations, the table assembly is equipped with a lock mechanism such that when the lock mechanism is engaged the table is fixed in place, and when the lock mechanism is released, the table can be moved in a direction toward the front or rear of the vehicle.

17 Claims, 16 Drawing Sheets

(56) References Cited

U.S. PATENT DOCUMENTS

| | | |
|---|---|---|
| 2008/0035034 A1 | 2/2008 | Morita et al. |
| 2009/0140537 A1 | 6/2009 | Kittelson |
| 2009/0223417 A1 | 9/2009 | Muirhead |
| 2010/0033070 A1* | 2/2010 | Cheng .................. H05K 7/1421 |
| | | 312/334.7 |
| 2015/0284090 A1 | 10/2015 | Stephens et al. |

\* cited by examiner

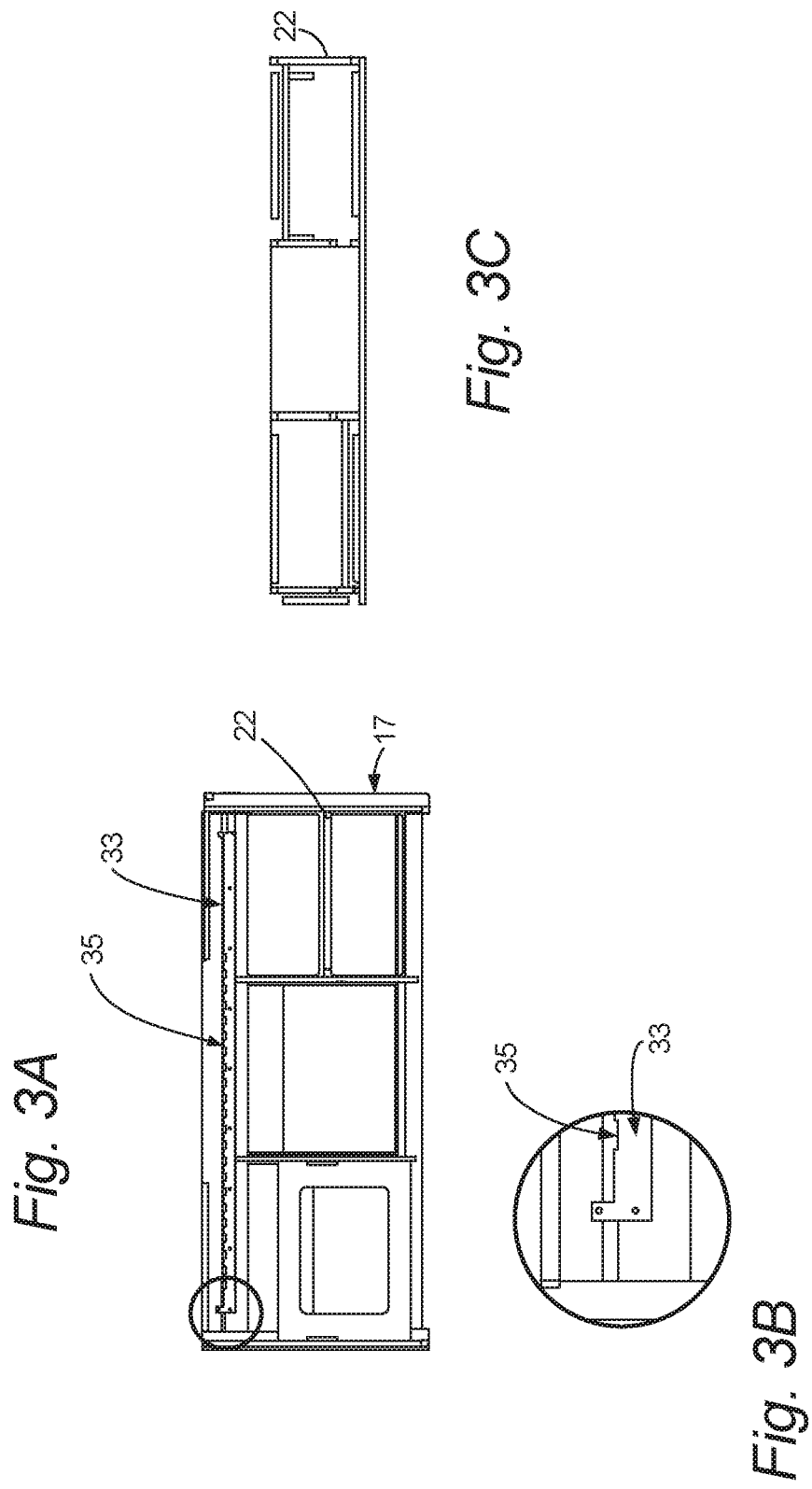

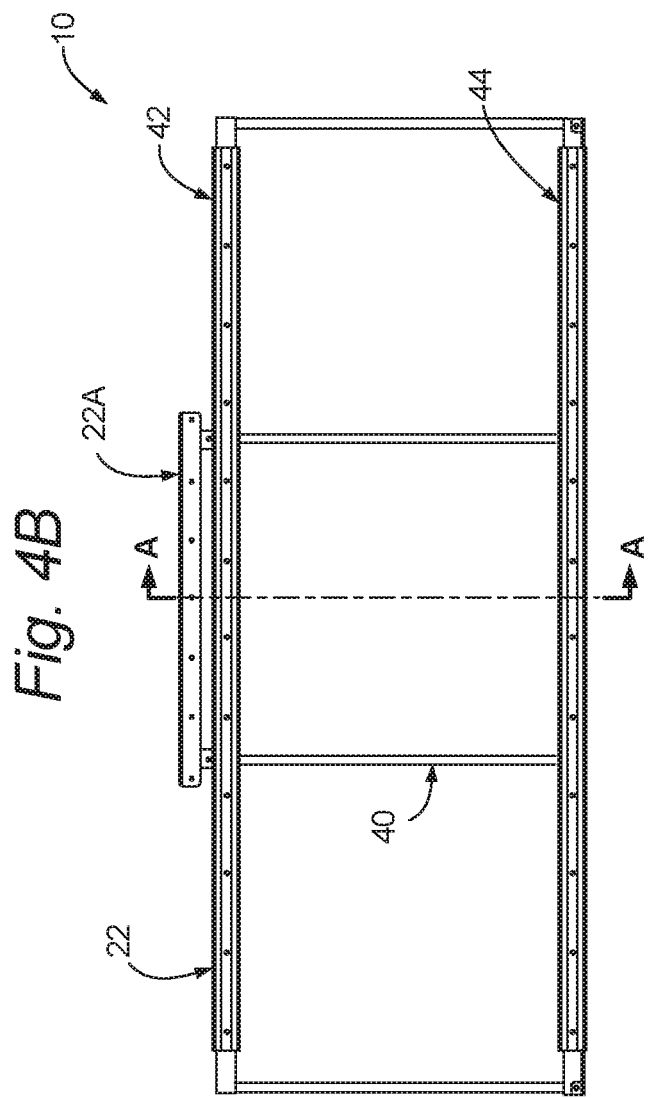
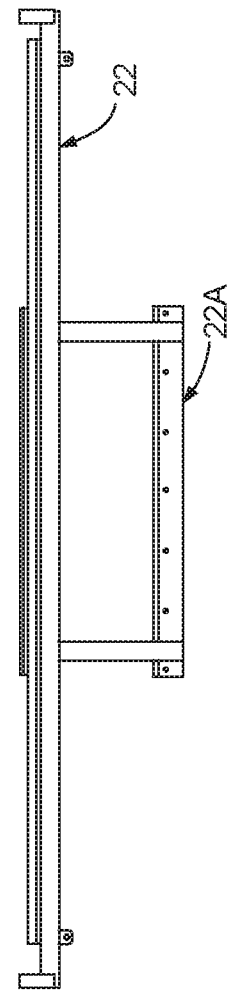
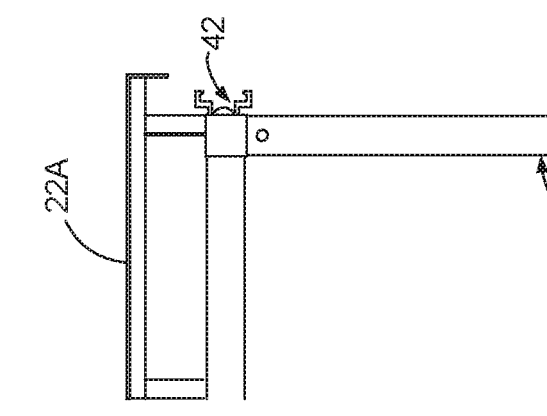

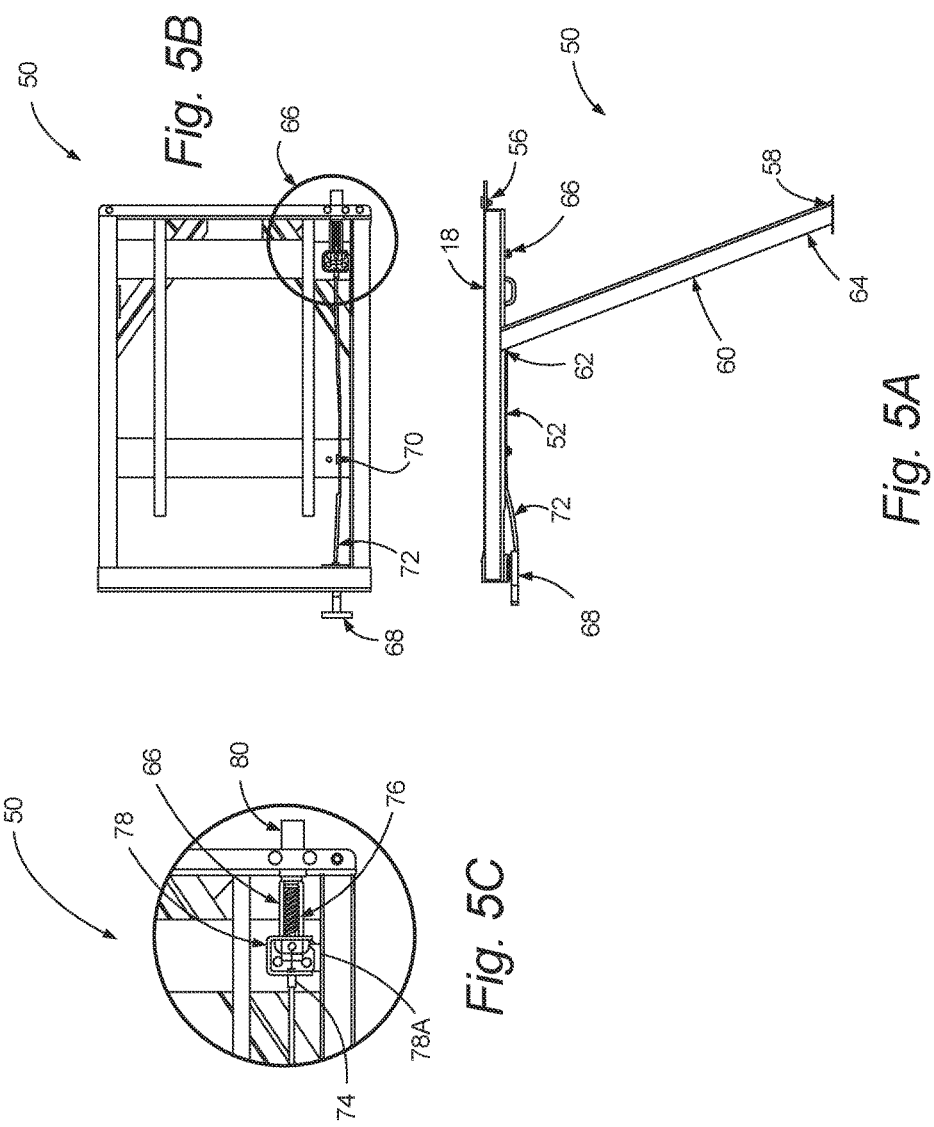

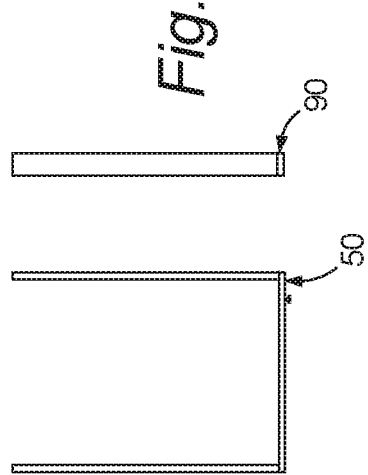
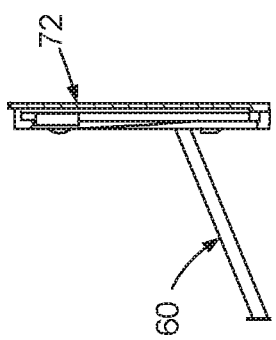
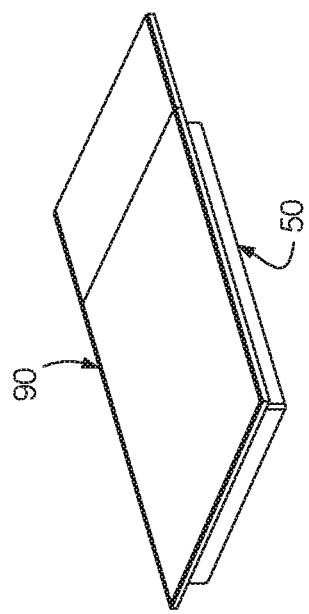
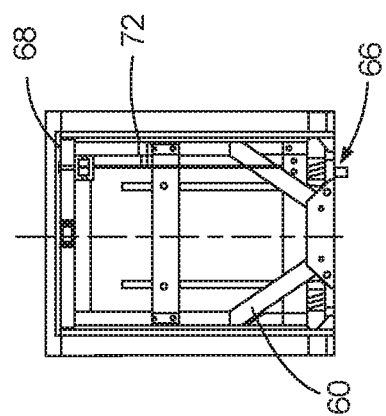

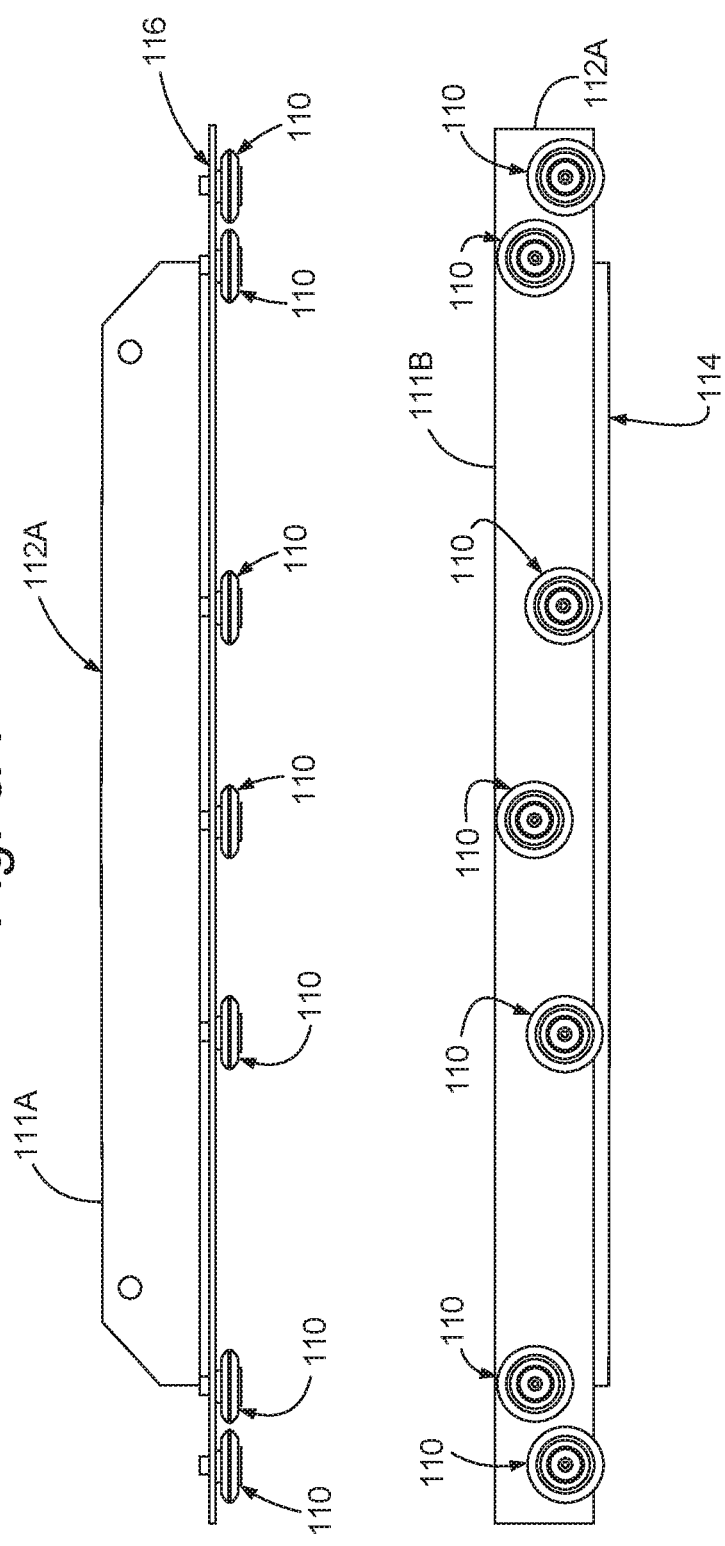

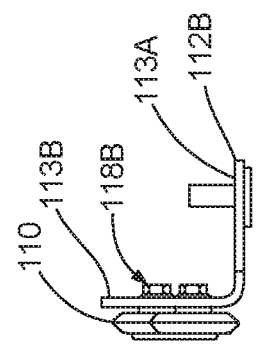
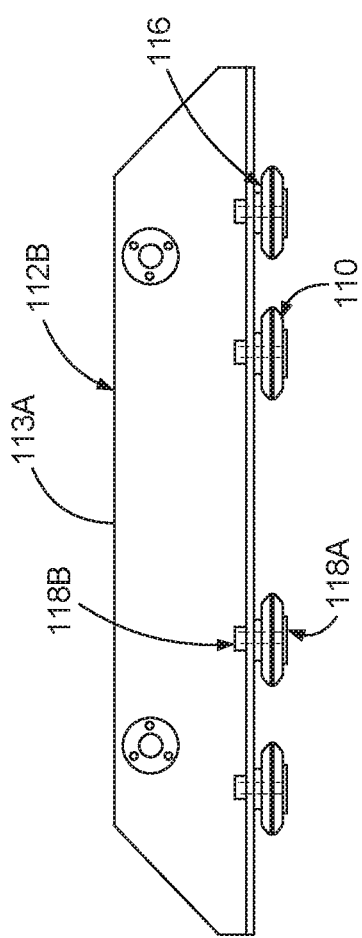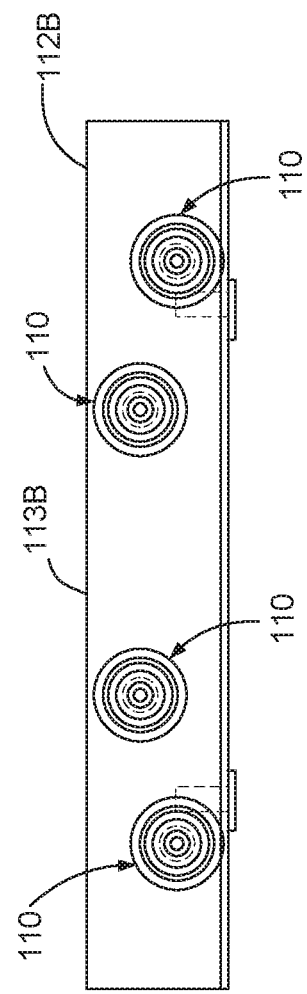

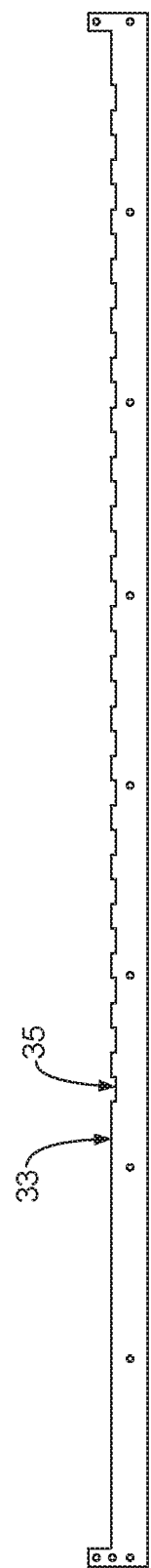
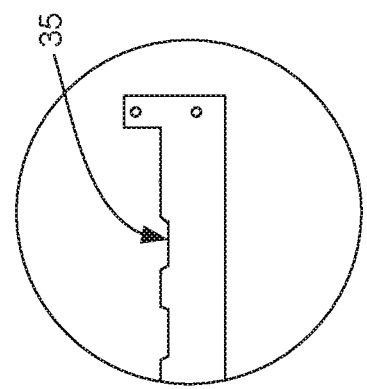

ued in the original application. The drawings and detailed description are to be regarded as illustrative in nature and not restrictive.

SLIDING TABLE ASSEMBLY FOR A VEHICLE AND RELATED SYSTEMS AND METHODS

CROSS-REFERENCE TO RELATED APPLICATION(S)

This application claims priority from U.S. application Ser. No. 14/210,855, filed Mar. 14, 2014 and entitled "Slideable Table for a Vehicle," which claimed priority to U.S. Provisional Application 61/789,416, filed Mar. 15, 2013, and entitled "Slideable Table for a Vehicle," both of which are hereby incorporated herein by reference in their entirety.

FIELD OF THE INVENTION

The sliding table assembly relates to devices, systems and methods which represent improvements in recreational vehicles and the like. More particularly, the invention relates to the interior fixtures of a recreational vehicle, notably a movable table.

BACKGROUND OF THE INVENTION

Recreational vehicles, such as motor homes, travel trailers and the like have interior spacing and dimensional constraints due to the nature of the size of the highways they traverse and the corresponding transportation regulations. Therefore, there are significant restrictions on the interior space, particularly as to the width of the vehicles. However, the users of these vehicles desire the most comfortable and usable space within the limited dimensions. These constraints thus place a premium on the efficiency and design flexibility of the interior décor of such vehicles. Amongst other design imperatives, versatile and compact interior furniture is highly valuable to the users of such vehicles. In particular, tables are a key piece a furniture and the center of many activities such as enjoying meals, playing games and the like. However tables can take up a great deal of the limited interior space of a recreational vehicle, and certain positions of a table may be ideal for some activities but not for others. Accordingly, there is a need in the art for slidable tables that can be easily repositioned, but that once positioned, are fixed and secure.

BRIEF SUMMARY OF THE INVENTION

As discussed herein, the sliding table system relates to a sliding table assembly for a recreational vehicle with a lock mechanism such that when the lock mechanism is released, the table can be moved in a direction toward the front or rear of the vehicle and when the lock is engaged, the table is fixed in place.

While multiple embodiments are disclosed, still other embodiments of the sliding table system will become apparent to those skilled in the art from the following detailed description, which shows and describes illustrative embodiments of the invention. As will be realized, the invention is capable of modifications in various obvious aspects, all without departing from the spirit and scope of the sliding table system. Accordingly, the drawings and detailed description are to be regarded as illustrative in nature and not restrictive.

BRIEF DESCRIPTION OF THE DRAWINGS

FIG. 3A is a rear view of an embodiment of the cabinet depicting an embodiment of a striker latch plate.

FIG. 3B is a close up drawing of a notch on the striker latch plate of FIG. 3A, as shown by the circle at B.

FIG. 3C is a top view of an embodiment of the cabinet.

FIG. 4A is a side cross-sectional view of one embodiment of the table support frame.

FIG. 4B is a front view of the embodiment of FIG. 4A.

FIG. 4C is a bottom view of the embodiment of FIG. 4A.

FIG. 5A is a side view of the table assembly, according to an exemplary embodiment.

FIG. 5B is a top view of the table according to the embodiment of FIG. 5A.

FIG. 5C is a close up view depicting the spring tensioned release catch of the embodiment of FIG. 5A.

FIG. 6A is an embodiment of the assembly showing the table.

FIG. 6B is a bottom view of the table of the embodiment of FIG. 5A

FIG. 6C is cross sectional view of the table, support frame, and the table support frame brace of the embodiment of FIG. 5A.

FIG. 6D is a section view of the embodiment of FIG. 6B.

FIG. 8A depicts a top-down view of one embodiment of the roller bearings and angle assemblies used at the top of the table support frame.

FIG. 8B depicts a side view of the embodiment of FIG. 8A.

FIG. 9A depicts a vertical view of one embodiment of the roller bearings and angle assemblies used at the bottom of the table support frame.

FIG. 9B depicts a side view of the embodiment of FIG. 9A.

FIG. 9C depicts an end view of the embodiment of FIG. 9A.

FIG. 10A depicts a top-down view of the striker latch plate, according to an exemplary embodiment.

FIG. 10B shows a close up view of one end of the striker latch plate of the embodiment of FIG. 10A.

DETAILED DESCRIPTION

The various systems and devices disclosed herein relate to apparatus, systems and methods for use in recreational vehicles. More specifically, various embodiments relate to various apparatus, systems and methods for adjusting the position of certain components, namely a tabletop.

Exemplary embodiments of the apparatus, systems and methods comprise a sliding table system and slideable mounting apparatus for a recreational vehicle, which for brevity will be referred to as the "table system" or "table assembly." Although the sliding table assembly or system has been described with reference to certain exemplary embodiments, persons skilled in the art will recognize that changes may be made in form and detail without departing from the spirit and scope of the apparatus, systems and methods.

Figure 1:
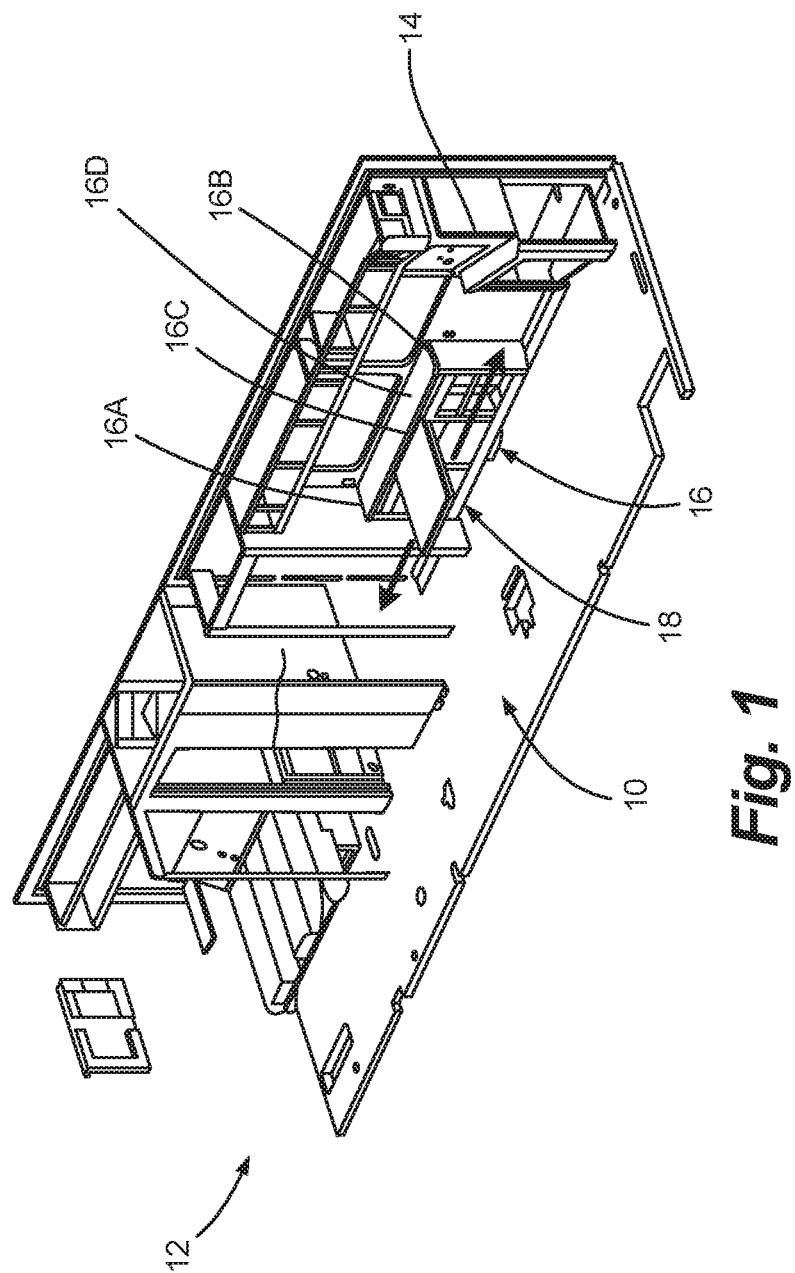
FIG. 1 is a perspective cutaway view of the inside of a recreational vehicle showing an exemplary embodiment of the sliding table assembly.

Referring now to the Figures with particularity, FIG. 1 shows three-quarters perspective view of the interior of a recreational vehicle 12 featuring an exemplary embodiment of the sliding table system, shown generally at 10. In this embodiment, the sliding table system 10 is mounted generally to an interior wall 14 of the recreational vehicle. Various exemplary embodiments comprise a cabinet housing 16 and adjustable table assembly 18. As is shown in FIG. 1, the cabinet housing 16 comprises first 16A and second 16B ends, a front side 16C and a back side 16D, which is fixedly attached to the recreational vehicle 12. As discussed elsewhere herein, in certain exemplary embodiments of the sliding table system, the cabinet housing 16 is operationally integrated with the adjustable table assembly 18. In further embodiments, the cabinet housing further comprises cabinetry. In certain exemplary embodiments of the sliding table system, the adjustable table 18 is movable relative to the cabinet housing 16, shown herein by the reference arrows A and B. In this embodiment, the movement of the adjustable table assembly 18 is substantially parallel to the floor 20 of the recreational vehicle 12, though other embodiments are within the scope of the sliding table system.

Figure 2B:
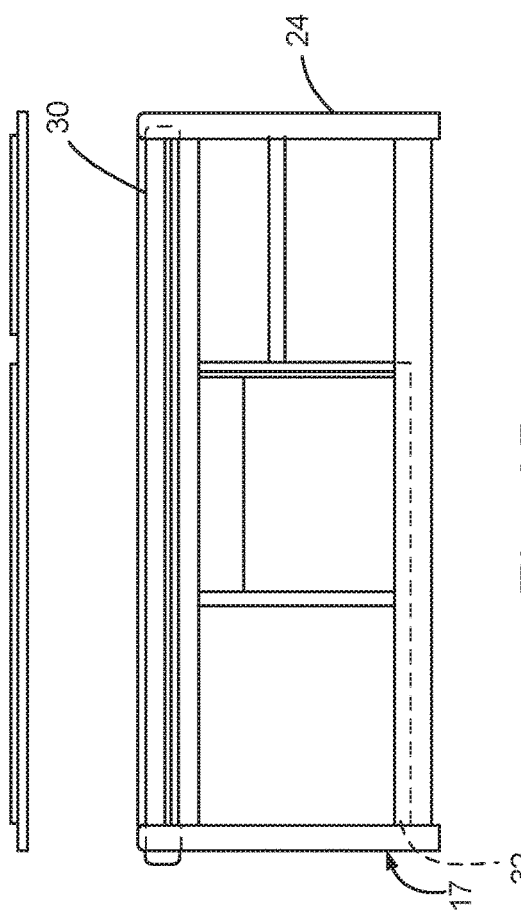
FIG. 2B is a side view of an embodiment of the cabinet showing the cabinet face and slots in the cabinet face.
Figure 2A:
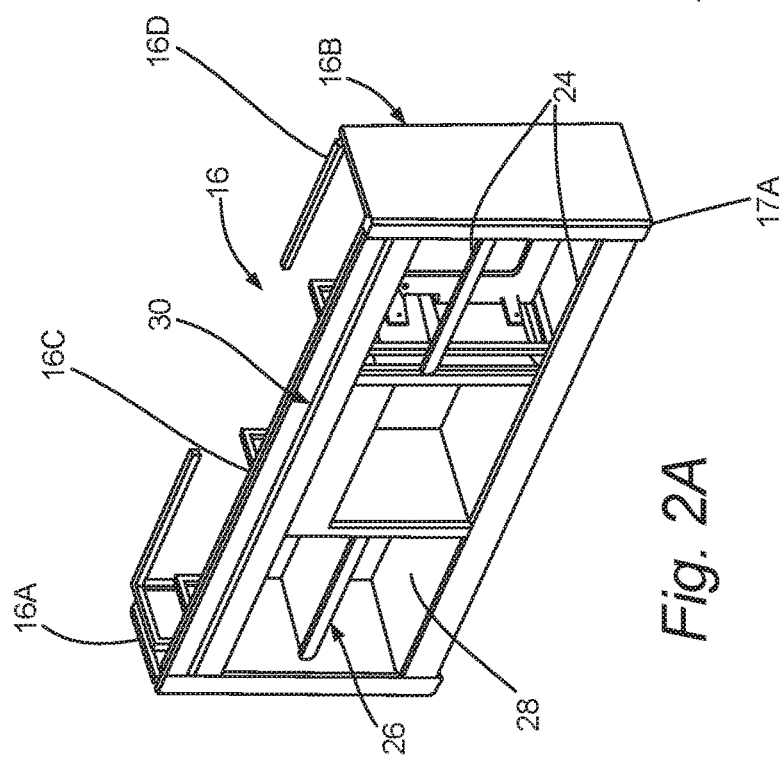
FIG. 2A is a perspective cutaway view of an embodiment of the cabinet showing the cabinet face and slots in the cabinet face.

FIGS. 2A-2B depict an exemplary embodiment of a cabinet housing 16 used in various embodiments of the sliding table system 10. The cabinet housing having first 16A and second 16B ends, a front side 16C and a back side 16D. In the embodiment depicted in FIGS. 2A-2B, the cabinet housing 16 further comprises a cabinet frame 17, which generally comprises a frame face 17A, a generally rectangular table slide frame 22, mountings 24 for slide drawers (not shown), shelving 26, and cabinet space 28. Many other configurations of basic cabinet assemblies can also be included. A principle aspect of the cabinet frame face 17A in these exemplary embodiments is a first substantially slotted opening, or first slot 30, which is operationally connected to a table support frame (shown in FIGS. 6A-6C). In certain embodiments, such as the one depicted in FIGS. 2A-2B, a second substantially slotted opening, or second slot 32, is operationally coupled to the table support frame.

FIGS. 3A-3C depict an exemplary embodiment of a cabinet housing 16 used in certain embodiments of the sliding table system. In various embodiments, the frame face 17A has been removed to reveal a striker latch plate 33 (shown in greater detail in reference to FIG. 10). In these embodiments, the striker latch plate 33 is disposed within and extends substantially the length of the cabinet housing 16 so as to extend from substantially the first end 16A to the second end 16B on the front side 16C of the cabinet housing 16. Accordingly, it is positioned generally below the first slot 30 (shown in FIGS. 2A-B). In certain embodiments the striker latch plate 33 has a plurality of notches 35 at substantially equal spacing along its length. The notches 35 are positioned to receive the latch pin from a spring tensioned release catch 66 mounted on the underside of the table support frame (best shown in FIG. 5C). FIG. 3C is a top view of the cabinet housing 16 of the embodiment of FIG. 2A.

FIGS. 4A-4C depict an exemplary embodiment of a table slide frame 22 used in certain embodiments of the sliding table system 10. In this embodiment, the generally rectangular table slide frame 22 comprises an upper track 42 and a lower track 44. Each of said tracks 42, 44 is operationally coupled to the table support frame (shown in FIG. 5A at 50) via a roller bearing assembly (as shown in FIGS. 8A-B and 10A-B at 112) to allow movement of the table 18 relative to the cabinet housing 16 and accordingly the generally rectangular table slide frame 22. The generally rectangular table slide frame 22 is positioned on the inside of the cabinet housing 16 such that the upper track 42 and lower track 44 are substantially parallel with the first slot 30 and the second slot 32 in the cabinet frame face 17A (as shown in FIG. 2B), but are not visible from the interior of the recreational vehicle 12. In FIGS. 4A-4C, the table slide frame 22 further comprises a cabinet attachment member 22A, which is fixedly attached to the cabinet 16.

FIG. 4A shows a side view of the generally rectangular table slide frame 22, and the upper track 42 and the lower track 44 from section A-A of FIG. 4B. FIG. 4B shows a front view of the generally rectangular table slide frame 22 and the upper track 42 and the lower track 44 can be seen. FIG. 4C depicts the cabinet attachment member 22A coupled to the generally rectangular table slide frame 22.

FIG. 5A shows a side view of another exemplary embodiment of a table support frame 50. In these embodiments, the table support frame 50 comprises a table frame assembly 52 fixedly attached to a table 18. Said table support frame 50 further comprises a first roller bearing assembly engagement member 56 and a second roller bearing assembly engagement member 58. The first roller bearing assembly engagement member 56 is positioned to operationally connect to a roller bearing assembly 112 through the cabinet face first slot (shown as reference number 30 in FIG. 2) and said second roller bearing assembly engagement member 58 is positioned to connect operationally to a roller bearing assembly 112 through the cabinet face second slot (32 in FIG. 2) such that both roller bearing assemblies 112 are operationally coupled with the table slide frame by way of the upper track 42 and lower track 44, respectively. The table support frame 50 further comprises a brace 60 having a first end 62 and a second end 64. The first end 62 is fixedly attached to the table frame assembly 52 and the brace 60 extends in a generally downward direction terminating with said second end 64 which is substantially parallel with the side of the table support frame closest to the cabinet 16. Said second brace end is operationally coupled to the second roller bearing assembly engagement member 58.

As shown in FIGS. 5A-5C, in certain embodiments, the table support frame 50 further comprises a spring tensioned release catch 66. FIG. 5B depicts a top view of the assembly, and FIG. 5C depicts a close-up of the region marked A. Certain embodiments further comprise a spring tensioned release catch handle 68, which is operationally coupled to the spring tensioned release catch 66 by way of a spring tensioned release catch comprises a cable 70 which extends the length of the table support frame 50, from the side closest to the cabinet housing 16 to the side furthest from the cabinet, as would be apparent to one of skill in the art. In certain embodiments, the cable 70 comprises a first end 72 and a second end 74 wherein said first end 72 is fixedly attached to a pull handle 68 and wherein said second end 74 is fixedly attached to spring release catch mechanism 66.

As is shown in FIG. 5C, in certain embodiments the release catch 66 further comprises a spring member 76, said spring member 76 housed within a bracket member 78 further comprising a bracket latch 78A and a table latch pin 80. In certain embodiments, the release catch 66 has two states: an unlocked state and a locked state. In the locked state, the spring 76 exerts pressure on the table latch member 80 pushing said latch pin 80 into the notch 35 of the striker latch plate 33 (as best shown in FIG. 3B) and preventing the movement of the table 18. In the unlocked state, the handle 68 is pulled and the spring member is compressed and the latch pin 80 is withdrawn from the notch 35 of the striker latch plate 33 allowing for movement of the table. When the handle 68 is released, the spring 76 extends and the latch pin 80 is coupled to a notch on the striker latch plate 33 and the table is returned to the locked state.

FIGS. 6A-6D show further embodiments of the table support frame 50. FIG. 6A shows a perspective view of the table top 90 and the table support frame 50. FIG. 6B shows an underside view of the embodiment of FIG. 6A, showing the details of the table support frame 50, which in certain embodiments further comprises at least one truss, or support brace 60. FIG. 6B also depicts the table support assembly and spring tensioned release catch 66. FIG. 6C depicts the view from segment A in FIG. 6A, showing the table top 90 and the table support frame 50 prior to fastening. FIG. 6D depicts the section view from section C-C in FIG. 6B.

Figure 7A:
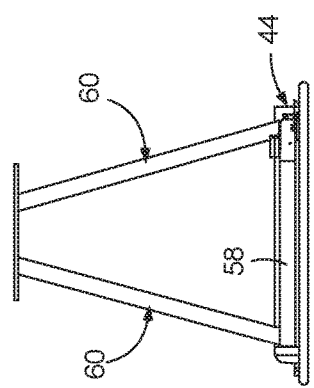
FIG. 7A shows a side view of one embodiment of the device showing the interface between the table support brace, the roller bearing tracks, and the slide frame.
Figure 7B:
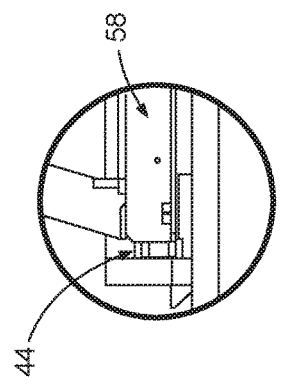
FIG. 7B shows a close up view of the embodiment of FIG. 7A.

FIG. 7A-7B show the interface between the table support brace 60, a roller bearing track 44, and the roller bearing assembly engagement member 58, as described in reference to FIGS. 4A-6D.

FIGS. 8A-8B show diagrams of exemplary embodiments an upper roller bearing assembly 112A of the roller bearings 110. The upper roller bearing assembly 112A comprises a horizontal plane 111A and a vertical plane 111B, with the roller bearings being mounted to the vertical plane 111B. The upper roller bearing assembly 112A is fixedly attached to the table support frame 50 and functionally integrated into the table slide frame 22 (substantially parallel with the table 18, as shown in relation to FIG. 1-2). In these implementations, the roller bearings 110 have been specifically designed and engineered to support the weight of the tabletop 18 as well as allow it to move within the table slide frame 22 and upper track 42. In certain implementations, a plurality of roller bearings 110 are affixed to a roller bearing plate 114. In certain embodiments a spacer such as a washer 116 is between the roller bearings and the roller bearing plate. In these embodiments, the roller bearings 110 engage with the slider plate inside the cabinet (not shown) and allow for movement of the table in a substantially horizontal direction, toward either the front or rear of the vehicle, as described elsewhere herein.

FIGS. 9A-9C show various views of the roller bearings 110 and a lower roller bearing assembly 112B. The lower roller bearing assembly 112B comprises a horizontal plane 113A and a vertical plane 113B, with the roller bearings being mounted to the vertical plane 113B used on the lower part of the table support frame (engaged by the bottom leg of the support brace 60), and operationally coupled with the table slide frame 22 and lower track 44 through the second slot 32 of the cabinet face frame 17 (FIG. 2). In certain of these embodiments, a plurality of fasteners 118A, 118B, such as screws and nuts, are used in combination with optional washers 116 to affix the roller bearings 110 to the angle assembly 112.

FIGS. 10A-10B depict various embodiments of the striker latch plate 33. FIG. 10B is a zoomed view of the detail in circle A of FIG. 10A, showing one embodiment of the notch.

FIGS. 11-16 depict various exemplary implementations of the sliding table system 10 showing the table 18, table support frame 50, brace 60, table slide frame 22 and upper roller bearing track 42 and lower roller bearing track 44 roller bearing tracks, and the operational integration of the table support frame 50 by way of the roller bearing assemblies 112A, 11. Various other configurations are possible.

Figure 11:
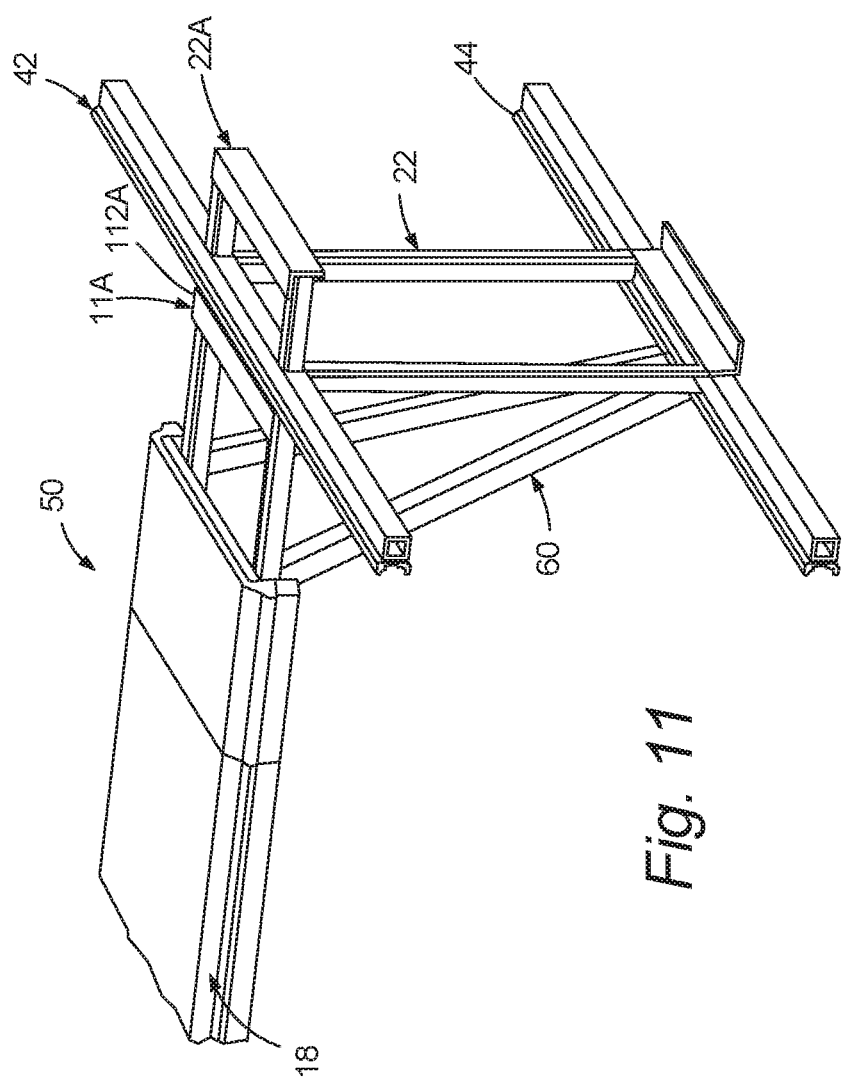
FIG. 11 is a perspective view of an exemplary implementation of the sliding table assembly showing the table, table support frame, brace, table slide frame and upper and lower roller bearing tracks.

FIG. 11 is a perspective view of an exemplary implementation of the sliding table assembly showing the table 18, table support frame 50, table slide frame 22, brace 60, upper track 42 and lower track 44.

Figure 12:
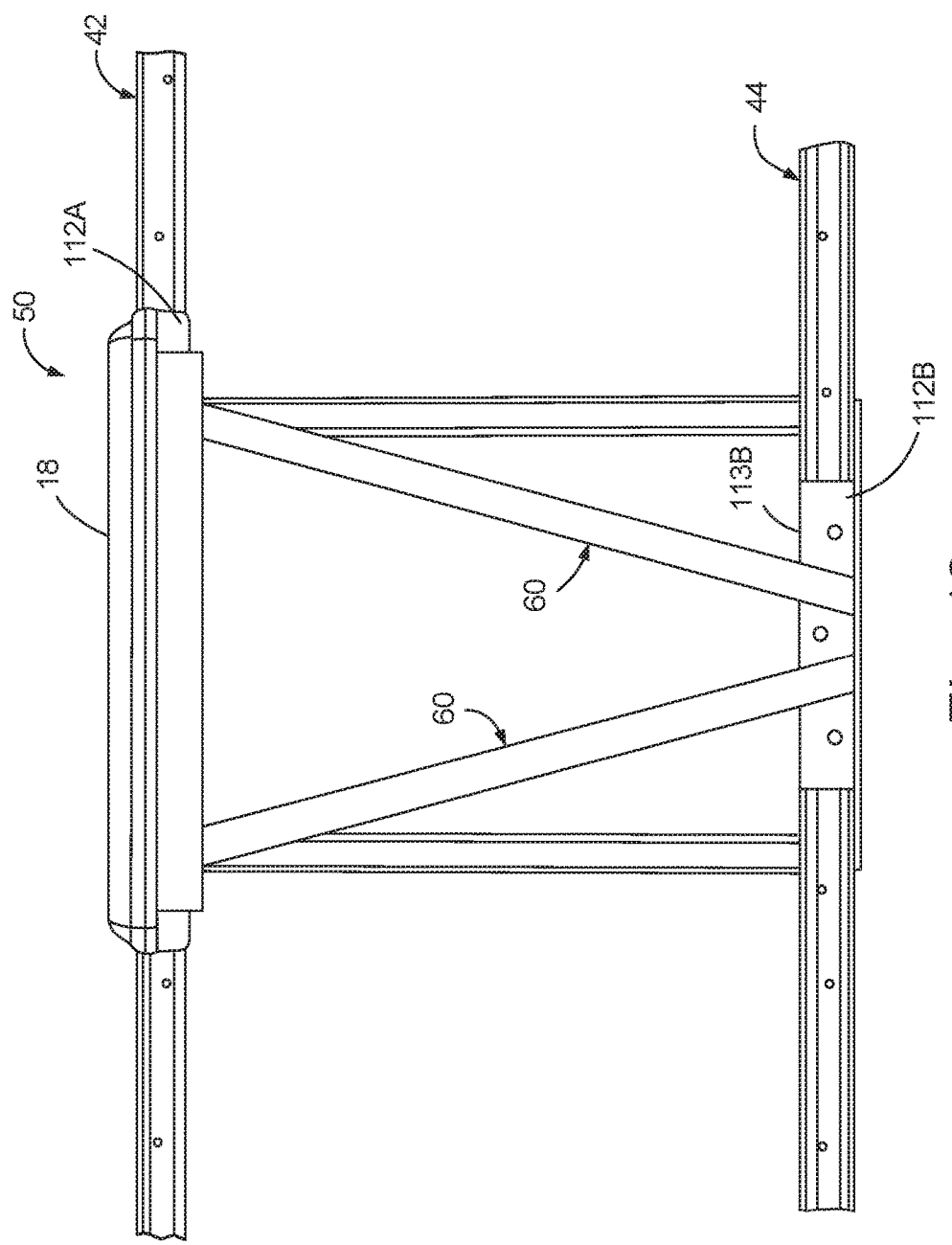
FIG. 12 is a front view of a further embodiment of the sliding table assembly showing the table support frame, table, brace, and upper and lower roller bearing tracks, from the point of view of the cabinet face, looking toward the cabinet face.

FIG. 12 is a front view of a further embodiment of the sliding table assembly showing the table support frame 50, table 18, brace 60, and upper track 42 and lower track 44, from the point of view of the cabinet face, looking toward the cabinet face.

Figure 13:
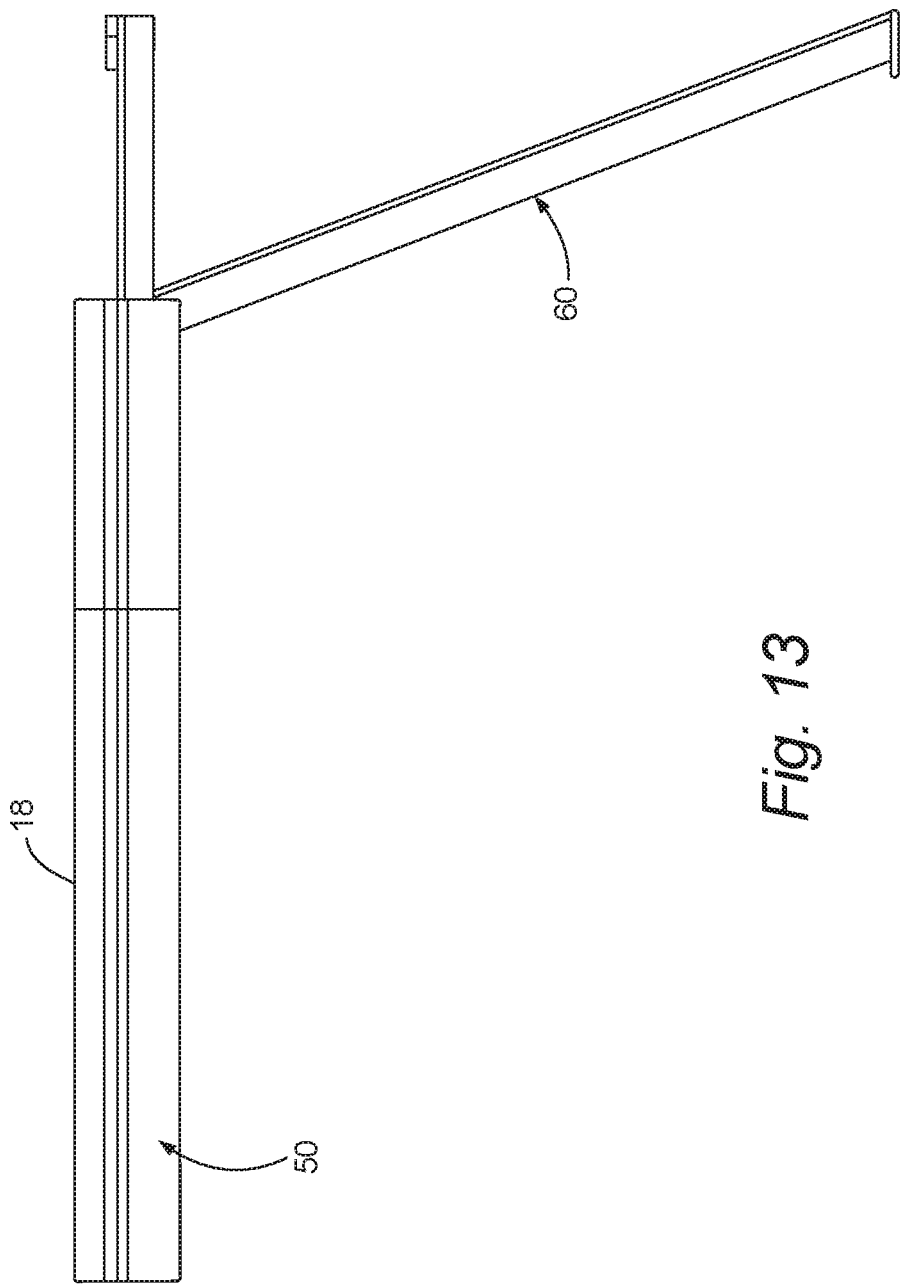
FIG. 13 depicts a side view of a further embodiment of the sliding table assembly showing the table, table support, and the brace.

FIG. 13 depicts a side view of a further embodiment of the sliding table assembly showing the table 18, table support frame 50, and the brace 60.

Figure 14:
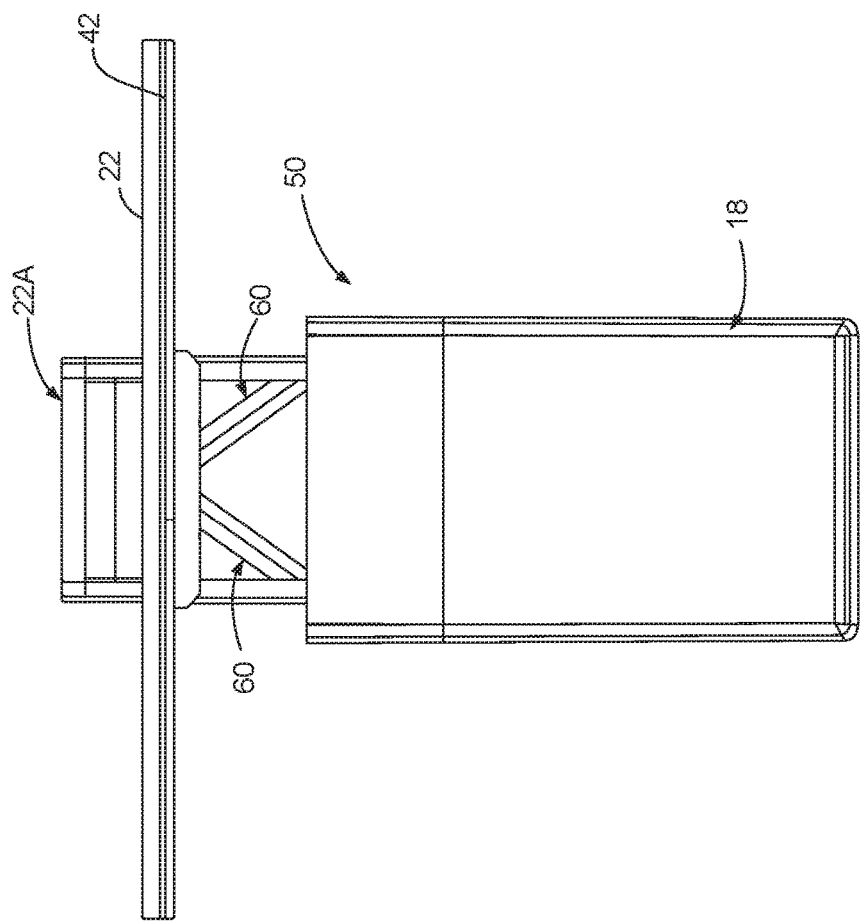
FIG. 14 is a top-down view of an exemplary embodiment of the table, table support frame, table support brace, upper roller bearing track and the table slide frame.

FIG. 14 is a top-down view of an exemplary embodiment of the table 18, table support frame 50, table support brace 60, upper track 42, cabinet attachment member 22A and the table slide frame 22.

Figure 15:
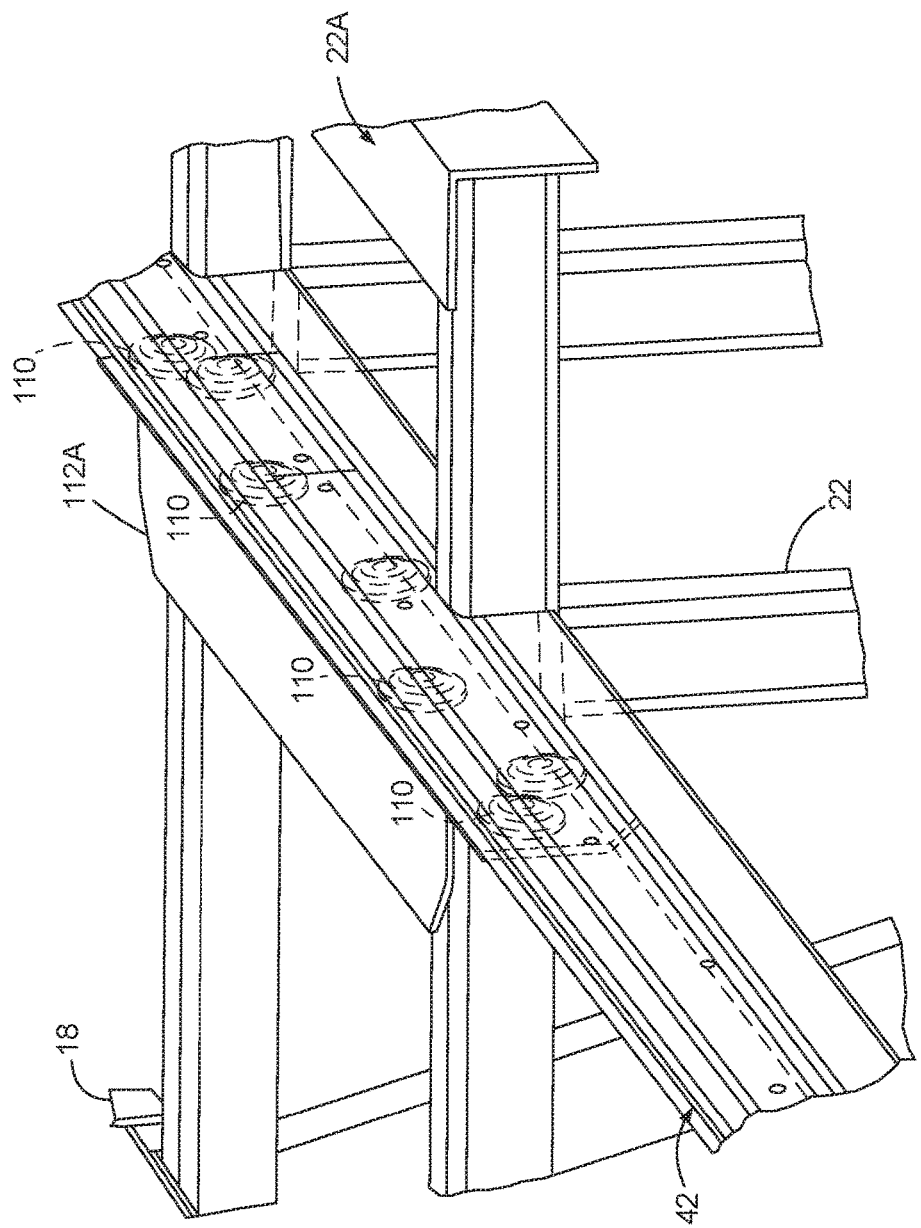
FIG. 15 is a cutaway perspective view of a further embodiment of the sliding table assembly showing the table support frame and the upper roller bearing assembly and its engagement with upper track of the table slide frame.

FIG. 15 is a cutaway perspective view of a further embodiment of the sliding table assembly 10 showing the table support frame 50 and the upper roller bearing assembly 112A and its engagement with upper track 42 of the table slide frame 22.

Figure 16:
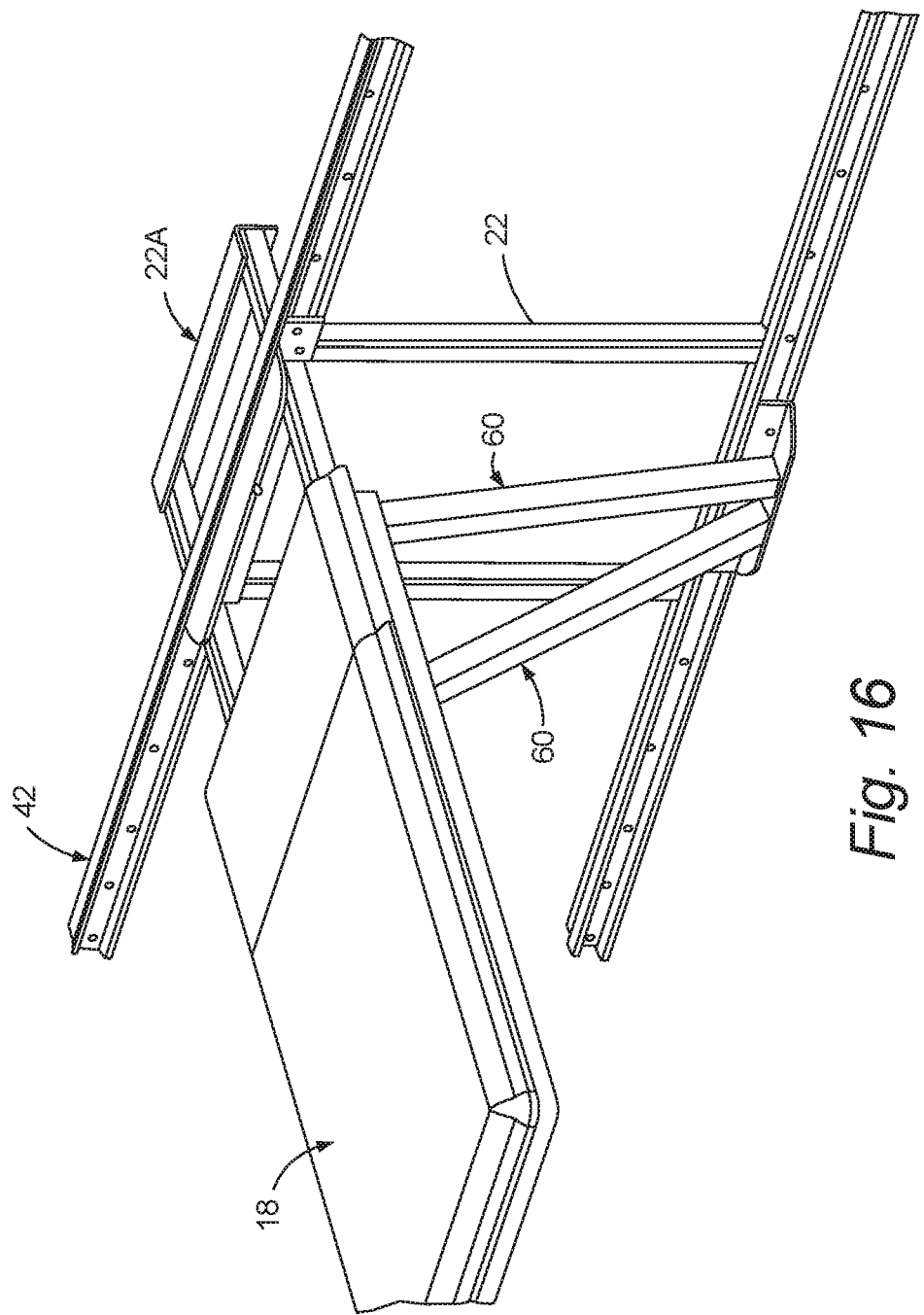
FIG. 16 is a perspective view of a further embodiment of the sliding table assembly showing the table, table support frame, table slide frame, top track and bottom track, upper roller bearing assembly and lower roller bearing assembly and table support brace.

FIG. 16 is a perspective view of a further embodiment of the sliding table assembly 10 showing the table 18, table support frame 50, table slide frame 22, top track 42 and bottom track 44, upper roller bearing assembly 112A and lower roller bearing assembly 112B and cabinet attachment member 22A.

Although the sliding table system has been described with reference to preferred embodiments, persons skilled in the art will recognize that changes may be made in form and detail without departing from the spirit and scope of the invention.

The invention claimed is:

1. A sliding table assembly comprising:
   a cabinet comprising at least one substantially horizontal slot disposed along the cabinet;
   a table slide frame disposed within the cabinet, the table slide frame comprising an upper roller bearing track and a lower roller bearing track; and
   a table comprising:
   a table support frame,
   at least one roller bearing assembly fixedly attached to the table support frame and in slidable communication with at least one of the upper or lower roller bearing tracks,
   a locking mechanism comprising a release catch, and a cable attached to the locking mechanism, the cable extending a length of the table support frame from the locking mechanism, wherein the table is at least partially disposed outside the cabinet and in slidable communication with the table slide frame via the at least one substantially horizontal slot.

2. The sliding table assembly of claim 1, wherein the cabinet comprises a front side, a first cabinet end, and a second cabinet end, wherein the at least one substantially horizontal slot is disposed along the front side between the first cabinet end and the second cabinet end.

3. The sliding table assembly of claim 2, wherein the at least one roller bearing assembly is disposed inside the cabinet.

4. The sliding table assembly of claim 1, further comprising a striker latch plate in operable communication with the locking mechanism.

5. The sliding table assembly of claim 4, wherein the release catch further comprises a latch pin.

6. The sliding table assembly of claim 5, wherein the striker latch plate comprises a plurality of notches in operational communication with the latch pin.

7. The sliding table assembly of claim 4, wherein the striker latch plate and the release catch are configured such that the upper roller bearing track is capable of a locked state and an unlocked state.

8. The sliding table assembly of claim 1, wherein the table further comprises:
a table support brace; and
upper and lower roller bearing assembly engagement members slidably connected to the upper and lower roller bearing tracks.

9. The sliding table assembly of claim 1, wherein the release catch further comprises:
a spring; and
a latch pin,
wherein the spring is in operational communication with the latch pin so as to be capable of urging the latch pin into contact with a striker latch plate coupled to the cabinet to prevent horizontal movement of the table.

10. A recreational vehicle comprising:
an interior wall; and
a cabinet coupled to the interior wall and having at least one substantially horizontal slot;
a table assembly comprising:
a table support frame,
at least one roller bearing assembly,
a table slide frame comprising an upper track and a lower track,
a locking mechanism configured to have locked and unlocked states, and
a cable attached to the locking mechanism, the cable extending a length of the table support frame from the locking mechanism;
wherein the table support frame is configured to be locked and unlocked via the locking mechanism by pulling or releasing the cable; and
wherein the table support frame is slidable relative to the interior wall, when unlocked, via the at least one substantially horizontal slot.

11. The recreational vehicle of claim 10, further comprising a handle coupled to the cable and in operable communication with the locking mechanism.

12. The recreational vehicle of claim 10, further comprising a striker latch plate in operable communication with the locking mechanism.

13. A sliding table assembly comprising:
a table comprising a table support frame, an upper roller bearing assembly, and a lower roller bearing assembly;
a cabinet comprising an upper horizontal slot, wherein the table at least partially extends through the upper horizontal slot;
a table slide assembly positioned within the cabinet and comprising an upper roller bearing track and a lower roller bearing track, wherein a portion of the upper roller bearing assembly is positioned within the upper roller bearing track, and wherein a portion of the lower roller bearing assembly is positioned within the lower roller bearing track; and
a locking mechanism coupled to the table.

14. The sliding table assembly of claim 13, wherein the locking mechanism comprises a striker latch plate comprising a plurality of notches.

15. The sliding table assembly of claim 13, wherein the table support frame is in selectively slidable communication with the table slide assembly.

16. The sliding table assembly of claim 15, wherein the locking mechanism is configured to utilize a strike latch plate including a plurality of notches for locking the table in place.

17. The sliding table assembly of claim 13, further comprising:
a cable attached to the locking mechanism to engage or disengage the locking mechanism to lock or unlock the table with respect to the cabinet.

* * * * *